US009049175B2

(12) United States Patent
Russo et al.

(10) Patent No.: US 9,049,175 B2
(45) Date of Patent: Jun. 2, 2015

(54) CLIENT-ADJUSTABLE WINDOW SIZE FOR CONNECTIONLESS TRANSFER PROTOCOLS

(75) Inventors: Richard T. Russo, Redmond, WA (US); Aaron Matthew Tyler, Redmond, WA (US); Chandan Rama Reddy, Redmond, WA (US); Manoj Krishna Ghosh, Redmond, WA (US); Alaa H. Abdelhalim, Bellevue, WA (US); Roger D. Seielstad, Redmond, WA (US); Peter A. Gurevich, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 315 days.

(21) Appl. No.: 12/959,233

(22) Filed: Dec. 2, 2010

(65) Prior Publication Data

US 2012/0143993 A1  Jun. 7, 2012

(51) Int. Cl.
  *G06F 15/16* (2006.01)
  *H04L 29/08* (2006.01)
  *H04L 12/807* (2013.01)
  *H04L 29/06* (2006.01)
  *G06F 12/00* (2006.01)

(52) U.S. Cl.
  CPC ............... *H04L 67/06* (2013.01); *H04L 47/27* (2013.01); *H04L 69/24* (2013.01); *H04L 69/326* (2013.01)

(58) Field of Classification Search
  USPC .......................... 709/203, 217–218, 223–229
  See application file for complete search history.

(56) References Cited

U.S. PATENT DOCUMENTS

| 4,736,369 | A | * | 4/1988 | Barzilai et al. ................. 370/231 |
| 5,163,046 | A |   | 11/1992 | Hahne |
| 6,185,678 | B1 |   | 2/2001 | Arbaugh et al. |
| 6,438,105 | B1 | * | 8/2002 | Qarni et al. .................... 370/231 |
| 6,901,593 | B2 | * | 5/2005 | Aweya et al. ................... 718/104 |

(Continued)

FOREIGN PATENT DOCUMENTS

CN          1670698 A       9/2005

OTHER PUBLICATIONS

Anumita Biswas, Enhancing TCP Performance Through the Large Window and SACK Options, Dec. 1, 2002, http://support.novell.com/techcenter/articles/ana20021203.html, p. 1-6.*

(Continued)

*Primary Examiner* — Zarni Maung
(74) *Attorney, Agent, or Firm* — Jim Banowski; Kate Drakos; Micky Minhas

(57) ABSTRACT

Described herein are various principles for operating transfer protocols using adaptive flow control techniques. In accordance with some of these principles, a client may adaptively negotiate with a server regarding a window size to use when communicating datagrams using a connectionless content unit transfer protocol like the Trivial File Transfer Protocol (TFTP). In some implementations, a client may inform a server whether to increase or decrease a window size. In these implementations, the client may increase the window size upon determining that a previous window size has led to successful transfer of content without any loss of datagrams and the client may decrease the window size upon detecting a loss of a datagram. Because of the limited resources available in some environments in which these techniques may be used, in some implementations a window size may be increased by small amounts but may be decreased drastically upon detecting a loss.

20 Claims, 9 Drawing Sheets

(56) References Cited

U.S. PATENT DOCUMENTS

| | | | |
|---|---|---|---|
| 7,133,362 | B2 | 11/2006 | Chu |
| 7,245,586 | B2 | 7/2007 | Bitar |
| 7,246,171 | B1 | 7/2007 | Ambrose |
| 7,570,584 | B1 | 8/2009 | Daley |
| 2003/0088667 | A1 | 5/2003 | Riedle |
| 2004/0003104 | A1 | 1/2004 | Boskovic et al. |
| 2004/0160957 | A1* | 8/2004 | Coffman ............ 370/394 |
| 2004/0267716 | A1* | 12/2004 | Prabu et al. ............ 707/3 |
| 2005/0005024 | A1 | 1/2005 | Samuels |
| 2005/0177625 | A1 | 8/2005 | Paek |
| 2008/0250155 | A1 | 10/2008 | Wang |
| 2009/0006642 | A1 | 1/2009 | Dickens et al. |
| 2009/0207848 | A1 | 8/2009 | Kwan et al. |
| 2009/0259809 | A1 | 10/2009 | Hung |
| 2010/0011203 | A1 | 1/2010 | Dickens et al. |
| 2010/0217889 | A1 | 8/2010 | Simcoe |
| 2012/0144060 | A1 | 6/2012 | Russo et al. |

OTHER PUBLICATIONS

Malkin et al , RFC-2347 TFTP Option Extension, May 1998 and RFC-2348 TFPT Blocksize Option, May 1998.*

Malkin et al , RFC- 2349 (TFTP Timeout Interval and Transfer Size Option May 1998).*

Yao et al., "Electrical Ingress Buffering and Traffic Aggregation for Optical Packet Switching and Their Effect on TCP-Level Performance in Optical Mesh Networks" IEEE Communications Magazine, Sep. 2002.

"Extending TFTP," available at: http://www.compuphase.com/tftp.htm, 2010, updated Mar. 9, 2010. Retrieved Aug. 30, 2010.

"PacketTrap TFTP Server," available at: http://www.tftp.co.uk/. Retrieved Aug. 30, 2010.

"How the PXE Server Works," available at: http://technet.microsoft.com/en-us/library/cc732649(WS.10).aspx, updated May 8, 2008. Retrieved Aug. 30, 2010.

Non-Final Office Action mailed Sep. 5, 2012 in U.S. Appl. No. 12/959,245; 31 pages.

Sollins, K.; RFC1350 "The TFTP protocol (Revision 2);" Jul. 1992; Internet Engineering Task Force; 11 pages.

Cisco Documentation; "Serving Files with the TFTP Service;" 1997; 6 pages.

Polites W. et al.; "Enhanced Trivial File Transfer Protocol (ETFTP);" Internet Engineering Task Force; Jun. 1995; 17 pages.

Velten, D. et al.; RFC-908 "Reliable Data Protocol;" Jul. 1984; BBN Communications Corporation; 63 pages.

Partridge, C. et al.; RFC-1151 "Version 2 of the Reliable Data Protocol (RDP);" Apr. 1990; BBN Communications Corporation; 5 pages.

Schulzrinne, H. et al.; RFC-3550 "RTP: A Transport Protocol for Real-Time Applications;" Jul. 2003; The Internet Society; 89 pages.

Notice of Allowance mailed Apr. 29, 2013 in U.S. Appl. No. 12/959,245; 17 pages.

Office Action dated May 26, 2014 in CN Pat. App. No. 201110394986.1, 15 pages, including partial translation and/or concise explanation of relevance.

* cited by examiner

CLIENT-ADJUSTABLE WINDOW SIZE FOR CONNECTIONLESS TRANSFER PROTOCOLS

BACKGROUND

Various types of protocols have been created for exchanging information via computer communication networks. Among these types of protocols are file transfer protocols. A file transfer protocol is adapted to copy a particular file of a file system from a source (also called a server) to a destination (also called a client).

Multiple file transfer protocols have been developed with various different characteristics, each of which may be suitable for particular computing or network environments. One popular file transfer protocol is simply called the File Transfer Protocol (FTP). FTP operates using the Transmission Control Protocol (TCP), which provides connections and other functionality enabling reliable transfer between computing devices. On top of the reliability offered by TCP, FTP can offer other functionality to ensure secure transfer and listing of files available for transfer.

Because of the functionality of FTP, programs that implement the protocol can require a great deal of resources from the devices running them. For example, programs that implement the protocol can take up a lot of space to store or a lot of processing time to run. Additionally, a device running such a program may need other software, like drivers and libraries, that implement other functionality needed by FTP, including software that implements TCP. In some cases, a computing device that a user wishes to use to exchange files may not have such resources or software. The computing device may not have access to a large amount of memory or processing resources, or may not have other software that implements TCP or other functionality.

When a computing device does not have enough resources or software to support FTP or other resource-intensive file transfer protocols, other, simpler file transfer protocols may be used. For example, the Trivial File Transfer Protocol (TFTP) may be used. TFTP operates using the User Datagram Protocol (UDP), which is a connectionless communication protocol that does not include functionality for reliable transmission. TFTP also does not include any functionality for authentication of users or security and normally does not include congestion control techniques. As a result, TFTP can be implemented with very little storage space, very little processing resources, and very little reliance on other software.

SUMMARY

TFTP is well-developed for situations where there are limited resources available for implementing a transfer protocol. However, in some such situations, some provisions of the TFTP protocol can prevent use of all available resources. For example, by using limited resources TFTP is typically adapted to use little bandwidth for transferring files. Such limitations may prevent TFTP from using available resources, including available bandwidth. When TFTP is used with files with small sizes, using little bandwidth does not adversely affect transfer as there is little data to be transferred. However, if TFTP were used with large files and/or multiple files, using little bandwidth can be an imposition that lengthens the amount of time to transfer the file(s).

Described herein are various principles for operating connectionless content unit transfer protocols, including connectionless file transfer protocols like TFTP, with adaptive flow control techniques that include adjustable window sizes. Such flow control techniques have not been used with connectionless transfer protocols because of the traditional emphasis on small resource consumption for these protocols. However, in embodiments operating in accordance with at least some of the principles described herein, a client and a server may negotiate regarding an initial window size to use for transferring content of a content unit, then may cooperate during the transfer to determine a suitable window size. In some embodiments, a client may not be initially adapted to negotiate a window size for a transfer. For example, the client may support a connectionless transfer protocol that is not able to use flow control techniques or adapt a window size in any way. When communicating with a client that does not natively support adapting a window size, a server may transmit to the client, prior to transmitting content of a requested content unit, software that enables the client to negotiate window sizes. In embodiments that use such software, the software sent to the client is executed by the client and the client, using the software, may then interact with the server to receive the content and to negotiate window sizes while receiving the content.

The client and server may negotiate window size in any suitable manner, including according to various examples given below. In some embodiments, because of the limited resources available in environments, a window size may be increased slowly, based on successes at smaller window sizes, but may be lowered greatly upon detecting an error. For example, in some case the window size may be adjustable using square root-order increases and exponential-order decreases.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
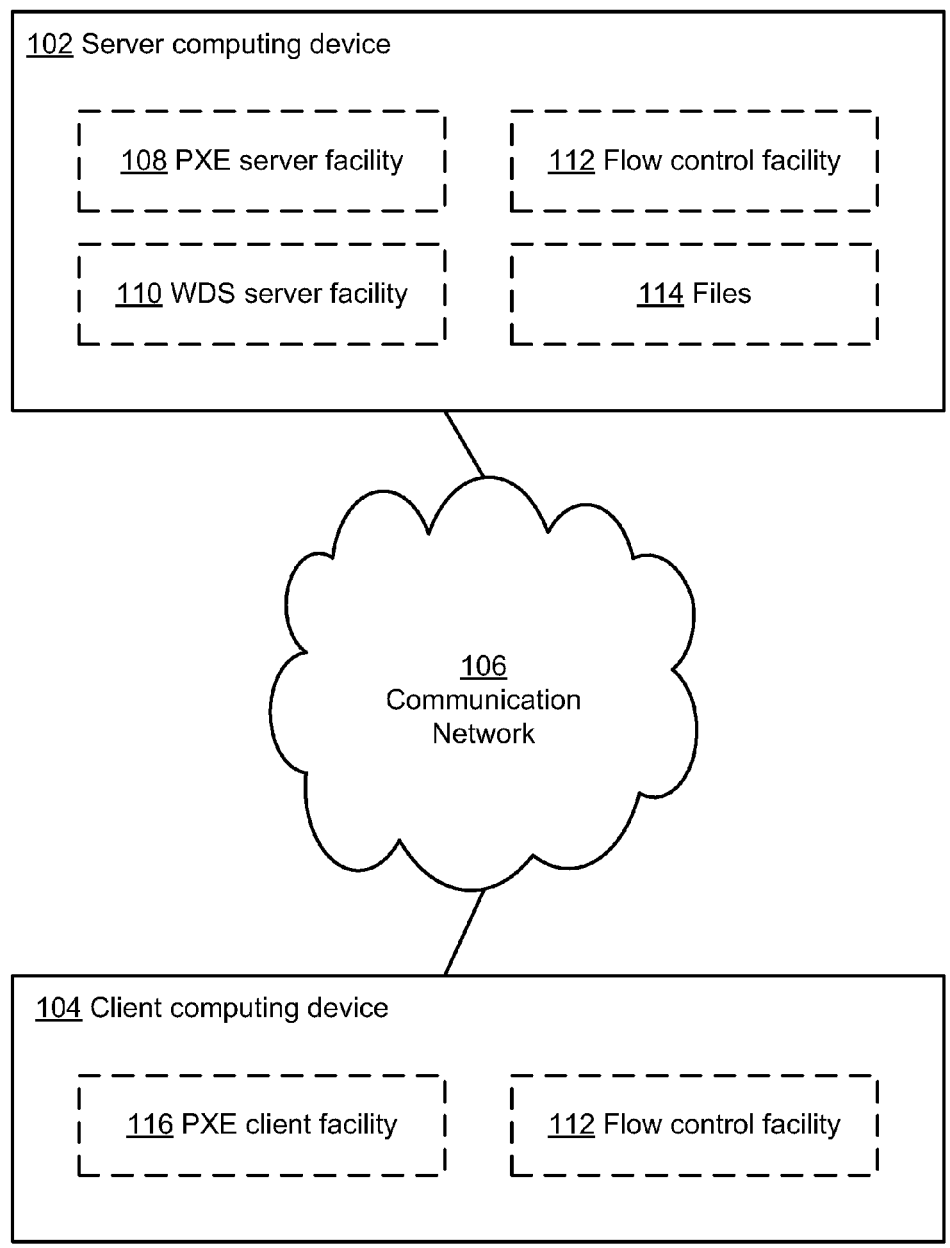
FIG. 1 is a block diagram of an exemplary computer system in which some embodiments may operate.

Connectionless content unit transfer protocols (also simply called connectionless transfer protocols herein), including the Trivial File Transfer Protocol (TFTP), are used in a variety of environments. For example, TFTP may be used in installing operating systems remotely.

In many cases, installing an operating system on a computing device requires a user to directly, manually operate that computing device to copy the operating system from a disc available locally, on the computing device. Such copying from a local disc can include copying from a Compact Disc (CD) or Digital Versatile Disc (DVD) being read by a component of the computing device. Such copying requires a user to visit the computing device to perform the installation, such that the disc (e.g., the CD) can be inserted into the computing device. Visiting the computing device may be difficult or burdensome in some cases, though. For example, if a user is a network administrator responsible for a network with many computing devices, visiting each computing device individually to install the operating system could take a great deal of time. As a result, some services have been created for remotely installing an operating system via a network. For example, the Windows® Deployment Services (WDS), available from the Microsoft Corporation of Redmond Wash., may be used to install an operating system over a computer communication network. In a WDS installation, a computing device on which an operating system is to be installed is operated in a limited-resource state, such as in the Preboot Execution Environment (PXE). When operated in PXE, there may be limited software available on the computing device for execution and some resources and devices may not be available on the computing device. In particular, software implementing protocols like TCP may not be available and many processing and memory resources of the computing devices may not be available. In some such limited-resource states, however, the computing device may include a TFTP client that is able to receive information communicated from a TFTP server. In this case, the TFTP server may have a copy of the operating system files or a disk image that includes operating system files and the TFTP server may transfer the file(s) using TFTP as part of installing the operating system.

As TFTP is specially adapted for limited-resource environments, TFTP is adapted to use limited resources, including limited bandwidth. As a result, TFTP conventionally operates without adaptive flow control. By operating without adaptive flow control, TFTP transfers data using a fixed window size of one datagram. With a window size of one, the TFTP server transmits one datagram to the TFTP client and will not transmit another datagram until the TFTP client acknowledges receipt of the one datagram. Operating with a fixed window size of one means that TFTP uses minimal bandwidth and also uses limited memory and processing resources in terms of maintaining information about what datagrams have been transmitted and negotiating window sizes. Other fixed window sizes than one have been used, which are in some cases configured globally, for an entire network, by an administrator of the network. Additionally, in one extension of TFTP, a client and server may negotiate, before any content of a file is exchanged, to determine a fixed window size to be used for transferring the content. This window size is then maintained at a fixed level while content of the file is transferred. In some cases, the negotiation may be governed by configuration information supplied by a user (e.g., an administrator) and, in some cases, the negotiation may lead to a same fixed window size being used for an entire network.

TFTP is therefore designed to operate in particular ways for most limited-resource environments by using limited resources to transfer content of files, including by using fixed window sizes. However, TFTP may be used in environments that are limited in some resources but not in others. For example, in some environments, there may be limited memory, processing power, and/or other software, but there may be a great deal of available bandwidth. One example of such a case is a computing device being operated in PXE and receiving, via TFTP, operating system files transferred using WDS. In such cases, a network over which the files are transferred may have a lot of bandwidth, but the computing device operated in PXE may have the limited memory, processing power, and other software. For this reason, TFTP does not use any sort of adaptive flow control when used with WDS, which may lead to using low, fixed window sizes and to wasted bandwidth and other resources. In such environments, protocols other than connectionless transfer protocols that have adaptive flow control are conventionally used to transfer content units, or otherwise connectionless transfer protocols are used that do not allow efficient use of available resources.

Described herein are various principles for operating transfer protocols like TFTP using adaptive flow control techniques. In accordance with some of these principles, a client may adaptively negotiate with a server regarding a window size to use when communicating datagrams using a connectionless content unit transfer protocol (also simply called a connectionless transfer protocol herein). In some implementations, a client may inform a server whether to increase or decrease a window size, such that available resources may be used but preferably not exceeded. In these implementations, the client may increase the window size upon determining that a previous window size has led to successful transfer of content without any loss of datagrams and the client may decrease the window size upon detecting a loss of a datagram. The window size may be monitored and/or adjusted throughout transfer of content. Because of the limited resources available in some environments in which these techniques may be used, in some implementations a window size may be increased by small amounts but may be decreased drastically upon detecting a loss. For example, the window size may be increased by one upon detecting success but may be halved upon detecting a loss. Performing flow control in this manner may allow for more efficient use of some resources while preventing other, limited resources from being overburdened.

In some embodiments, a client that requests that a content unit be transferred may not be able to use adaptive flow control techniques. A server, however, may have flow control facility that is able to use adaptive flow control techniques and that the server could transmit to the client. In some such cases, when the client requests a content unit from the server, the server may transmit the flow control facility to the client. The client may then execute the flow control facility. The flow control facility on the client may request the content unit from the server and, while the content unit is being transferred, negotiate with the server regarding a window size. In some embodiments, the server may always transfer the flow control facility to the client without determining whether the client natively supports adaptive flow control. In some such embodiments, the flow control facility may be incorporated into a file that the client requests. For example, in some environments (like in the WDS example described below in connection with FIG. 2), a client may request a first file that is a program that will be executed by the client and used to request and receive one or more other files, and the flow control facility may be incorporated into the first file.

The window size, as mentioned above, governs a number of datagrams that a server may transmit to a client without receiving acknowledgements from the client that datagrams have been properly received. With a window size of one, for example, a single datagram will be sent from the server to the client and the server will wait to receive an acknowledgement message before sending another datagram. With a window size of two, the server may transmit two datagrams before waiting, and can transmit another datagram when one is acknowledged. In this way, the server permits only a maximum number of datagrams (the window size) to be communicated to the client without receiving acknowledgements, such that only a certain number of datagrams have to be retransmitted if there is an error in the network or on the client. In embodiments, a client and a server may, before and during transferring of content, set and change a window size to use during the transferring.

For ease of description, examples below are described in connection with the Trivial File Transfer Protocol (TFTP). Embodiments are not, however, limited to operating with TFTP. Other connectionless content unit transfer protocols may be operated with adaptive flow control techniques according to principles described herein. A content unit transfer protocol, as described herein, includes protocols adapted for transmitting a content unit from a server to a client. A content unit is an atomic unit of storage in a storage system, and content of the content unit may be transferred using the transfer protocol. Where a storage system is a file system, a content unit may be a file, and a content unit transfer protocol may be a file transfer protocol for transferring files. A connectionless transfer protocol maybe a content unit transfer protocol that does not establish a connection when transferring content. For example, some connectionless transfer protocols may transfer content using the User Datagram Protocol (UDP) that operates without connections. Some connectionless transfer protocols may also operate without functionality available in other transfer protocols that use more resources or, for example, use connections. For example, some connectionless transfer protocols may not use security features such as authentication or encryption, as these security features may use more resources than available. Additionally, some connectionless transfer protocols may operate without congestion detection techniques. As mentioned above, TFTP is one example of a connectionless content unit transfer protocol. Other protocols are possible, however.

Additionally, examples are given below of using TFTP in a process for installing operating systems over a network. Embodiments are not limited to operating with connectionless transfer protocols that exchange operating system information or files. Rather, connectionless transfer protocols that use flow control techniques according to principles described herein may exchange any suitable type of content.

Figure 2:
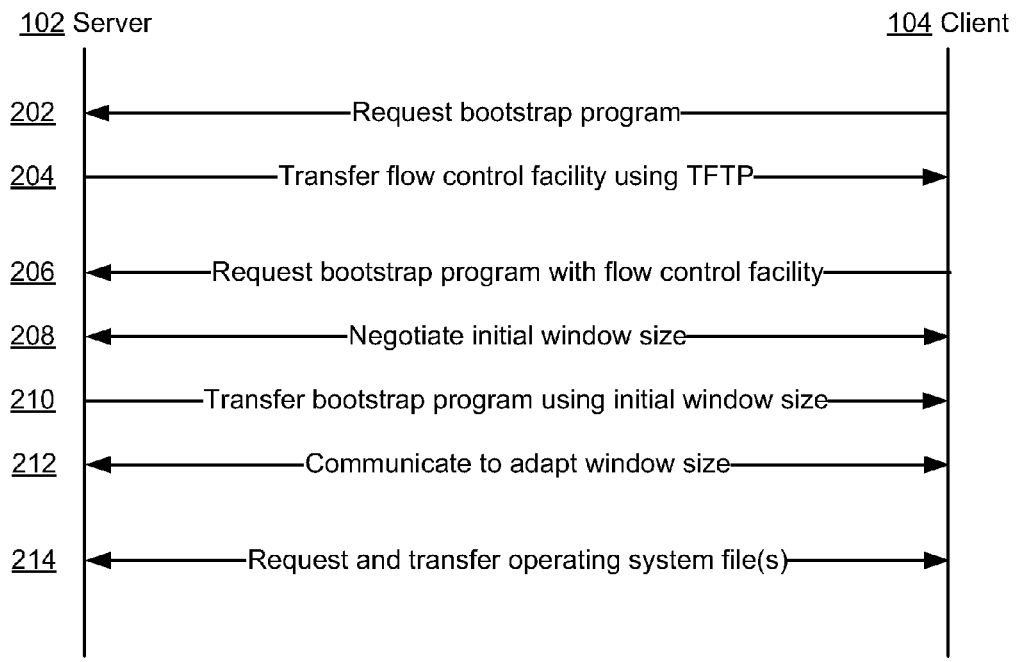
FIG. 2 is a diagram of a first communication flow that may be carried out in some embodiments.

FIG. 1 illustrates one exemplary environment in which some embodiments of principles described herein may operate. FIG. 2 illustrates a timing diagram for communications that may be exchanged when the server 102 and client 104 of the environment 100 of FIG. 1 are operated according to some of the techniques described herein.

The exemplary environment 100 of FIG. 1 includes a server computing device 102 and a client computing device 104 that are connected via any suitable wired and/or wireless communication network 106. The server 102 and the client 104 may communicate via the network 106 as part of a WDS process to install an operating system on the client 104. The server 102 and client 104 therefore each include various components to be used in exchanging content related to WDS and carrying out WDS properties. Among these components are functional facilities that implement a connectionless transfer protocol like TFTP for communicating content units between the server 102 and the client 104.

The server 102 includes a PXE server facility 108 and a WDS server facility 110 that may operate according to the WDS protocol for distributing operating system components. The operating system components, such as a network bootstrap program (NBP), which is a known component of the WDS process, and an image for the operating system to be installed, may be stored as files 114 that are accessible to the server 102. The files 114 may be stored in a storage that is a part of the server 102 or may be accessible to the server 102 in any other way, including stored on another computing device available via the network 106. The client 104 includes a PXE client facility 116 that may interact with the PXE server facility 108 and the WDS server facility 110 to launch an installation process using WDS.

When the server 102 and client 104 communicate to exchange files using WDS, a connectionless transfer protocol like TFTP may be used to exchange files between the server 102 and the client 104. In accordance with techniques described herein, an adaptive flow control process may be used with TFTP, such that when the content is exchanged using TFTP the window size that is used for transferring the content may be adjusted during the transfer. In some cases, however, a client may not be adapted to use the adaptive flow control techniques. For example, the PXE client facility 116 of the client 104 may be adapted to use conventional TFTP, without adaptive flow control. The client 104 may not be able to negotiate with the server 102 regarding the window size in these cases.

However, the server 102 may include a flow control facility 112 that includes TFTP functionality as well as adaptive flow control functionality. The flow control facility 112 may be designed to be transferred to the client 104 by the server 102, such that the client 104 is able to use adaptive flow control techniques and is able to negotiate with the server 102 regarding window size. In FIG. 1, the flow control facility 112 is illustrated on both the server 102 and on the client 104, as the facility 112 may be transferred to the client 104.

The facility 112 may be transferred to the client 104 during a WDS session, in which an operating system is to be installed on the client 104. As WDS and PXE are known in the art, a detailed description of WDS and PXE will not be provided herein. However, some information about WDS may be helpful in understanding some situations in which the facility 112 may be transferred to the client 104 and how adaptive flow control may be used to exchange content units in some embodiments.

FIG. 2 shows a diagram of communications that may be exchanged in one exemplary WDS session between the server 102 and client 104 of FIG. 1. In this session, adaptive flow control techniques are used with TFTP and WDS.

In short, during a WDS session a client requests from one or more servers both software and configuration information for downloading operating system files and the operating system files themselves. As part of this process, a client operating in a limited-resource state like PXE requests from the server a network bootstrap program (NBP) that the client can execute to download the operating system files. Once the NBP is downloaded, the client executes the NBP and downloads the operating system files.

Accordingly, in the example of FIG. 2, in communication 202 a PXE client facility 116 on the client 104 transmits from the client 104 to the server 102 a request to transfer the bootstrap program. In response, rather than simply providing the bootstrap program, in communication 204 the server 102 transfers the flow control facility 112 to the client 104 using conventional TFTP. Upon receipt, the client 104 begins executing the facility 112 in the PXE environment and the facility 112 begins communicating with the server 102.

In communication 206, the facility 112 requests that the bootstrap program be transferred. In one or more communications 208, the facility 112 and the server 102 then negotiate with one another in any suitable manner to determine an initial window size to be used for transferring content between the server 102 and the client 104. In some implementations, the facility 112 and the server 102 may negotiate using standard configuration techniques and message formats for TFTP that are used to establish other communication parameters. In some cases, the facility 112 may suggest an initial window size to the server 102 using these standard communication techniques and the server 102 may approve or decline the suggestion. If the server 102 declines the suggestion, the facility 112 may suggest another window size.

In communication 210, following the negotiation for the initial window size, the server 102 begins transmitting the bootstrap program to the client 104 using the initial window size negotiated in communication(s) 208. During the transfer, the server 102 and client 104 may monitor for whether any datagrams are lost during transmission and adjust the window size accordingly. If no datagrams have been lost during a period of time, then the window size may be increased. Conversely, upon detecting loss of one or more datagrams, the window size may be decreased. Therefore, in communications 212, the server 102 and client 104 (still executing the facility 112) may communicate with one another to adapt the window size.

Following transmission of the bootstrap program, the client 104 may begin executing the bootstrap program. Using the bootstrap program, the client 104 may carry out the remainder of the WDS process and, as such, in communications 214 the client may request and transfer operating system files. In some implementations, the operating system files may be transferred in communications 214 using TFTP. In such cases, adaptive flow control techniques may also be used in communications 214. Accordingly, while not illustrated in FIG. 2, the bootstrap program and the server 102 may negotiate regarding an initial window size and may, during transfer of operating system files, communicate further to adapt the window size.

While in the example described above, the flow control facility 112 is a different piece of software than the network bootstrap program (NBP), embodiments are not so limited. In some other embodiments, rather than two different pieces of software, the bootstrap program may include the flow control facility 112 or otherwise include functionality to enable a client 104 to receive content using adaptive window sizes. In such embodiments, the server 102 may transfer to the client 104 the bootstrap program using TFTP without adaptive window sizes and the client 104 may execute the bootstrap program upon receipt. When executing the bootstrap program, the client 104 may request and receive operating system files using TFTP and using adaptive window sizes.

Figure 3:
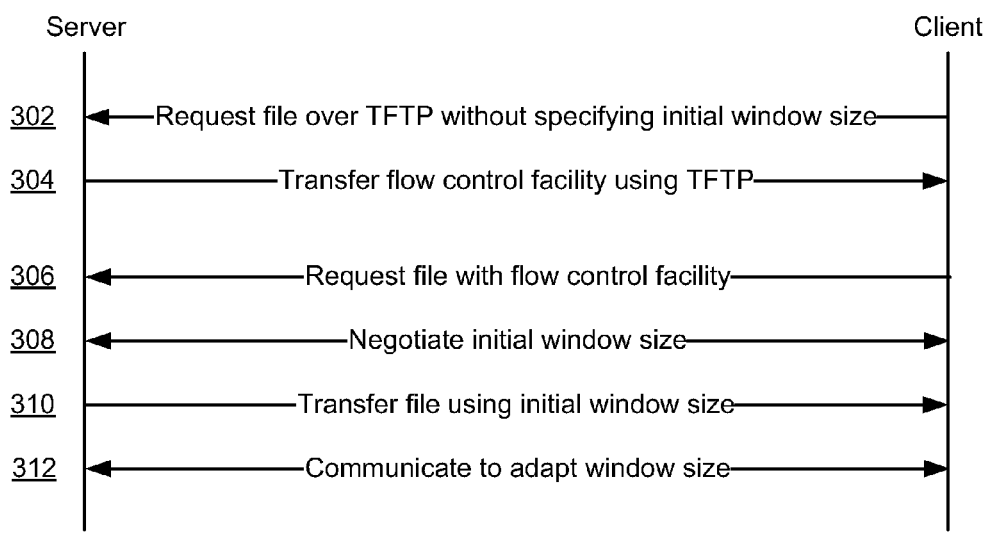
FIG. 3 is a diagram of a second communication flow that may be carried out in some embodiments.

As mentioned above, adaptive flow control techniques operating in accordance with principles described herein are not limited to being used in connection with WDS or other operating system installation systems. Rather, the adaptive flow control techniques may be used in any system for transferring files or other content units. In some embodiments, the adaptive flow control techniques may be used in computing devices with limited memory or processing resources and/or computing devices without software resources necessary for other file transfer protocols, including connection-based file transfer protocols. For example, the adaptive flow control techniques may be used in computing devices for which software implementing the Transmission Control Protocol (TCP) is not installed, not supported, or otherwise not available. FIG. 3 shows a diagram of communications that may be exchanged in other systems for transferring content units that use connectionless transfer protocols with adaptive flow control according to techniques described herein.

The communications of FIG. 3 begin with communication 302, in which a client requests that a server transfer a file to the client using TFTP. In the communication 302, the client may not specify any initial window size to be used when transferring the file. The server may therefore determine that the client is not able to use adaptive flow control with TFTP and may, in communication 304, transmit a flow control facility to the client using TFTP. The flow control facility, as mentioned in examples above, may include functionality to implement both conventional TFTP and adaptive flow control techniques, such that the client, upon executing the flow control facility, is able to use TFTP with adaptive flow control.

Upon receiving the flow control facility using TFTP, the client may execute the flow control facility and the flow control facility may begin interacting with the server. In communication 306, the flow control facility again requests from the server that the file be transferred and, in communication(s) 308, negotiates with the server regarding the initial window size. As above in the example of FIG. 2, the negotiation may be carried out in communication(s) 308 using standard configuration techniques for TFTP, including standard messages and message formats, but the negotiation may be carried out in any suitable manner. In some cases, the client may propose window sizes and the server may accept or reject the proposals. Once the client and server agree on an initial window size, the server in communication(s) 310 begins transferring the file requested in communication 306 using the initial window size. The server may agree on the initial window size in any suitable manner, including by accepting the first value proposed by the client or by evaluating the proposed window sizes based on any suitable factors or any suitable information available to the client. During the transfer, the client and server may monitor the success of the transfer and whether any datagrams have been lost and may exchange communication(s) 312 to adapt the window size accordingly.

Examples of ways in which some of the principles described herein may be implemented and environments in which they may be used were described generally above in connection with FIGS. 1-3. Other examples are provided below of more detailed ways in which these principles may be implemented. Embodiments are not, however, limited to implementing any of the techniques described below and may implement none, some, or all of these techniques. Additionally, as discussed above, the examples below will be discussed in terms of transferring files using TFTP. Embodiments not limited, however, to exchanging files or to using TFTP.

Figure 4:
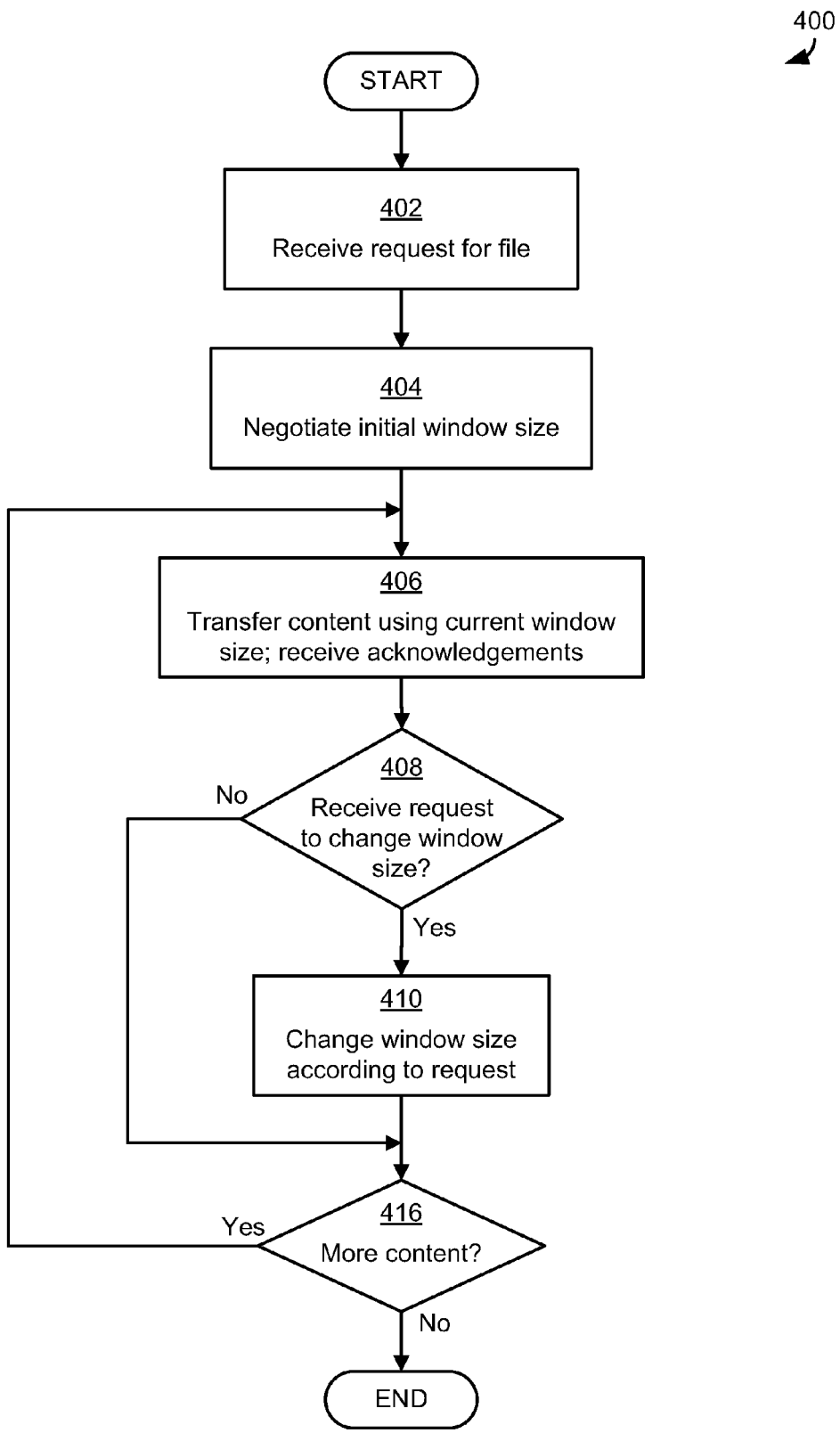
FIG. 4 is a flowchart of one exemplary process that may be carried out by a server in some embodiments to transfer content using adaptive flow control.
Figure 5:
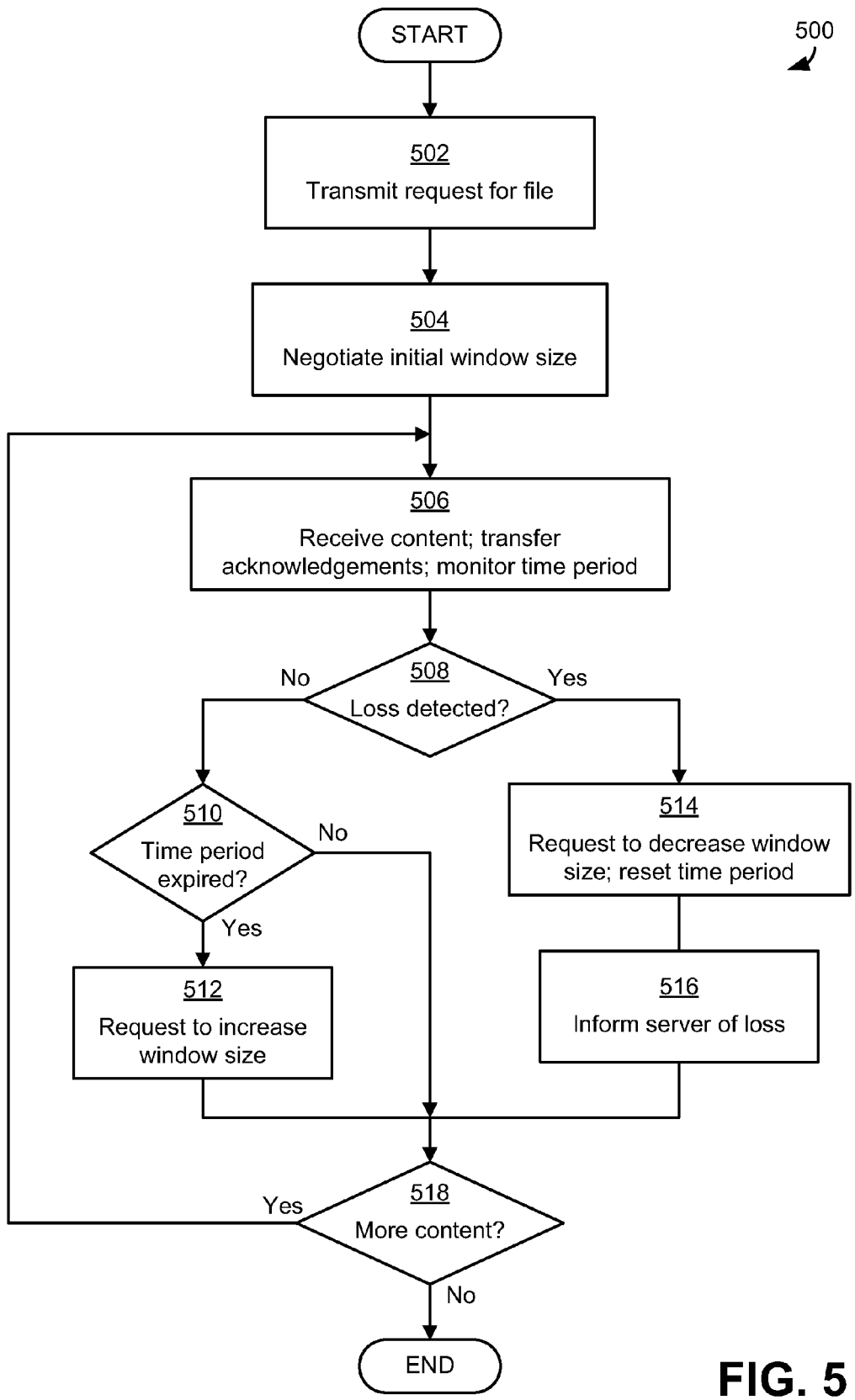
FIG. 5 is a flowchart of one exemplary process that may be carried out by a client in some embodiments to receive content using adaptive flow control.

FIGS. 4 and 5 are flowchart of operations that may be carried out on a server and on a client in one exemplary embodiment of techniques described herein. FIG. 4 shows an example of a process that may be carried out on a server to transfer a content unit and FIG. 5 shows a corresponding process that may be carried out on a client for receiving a content unit. By carrying out processes like those of FIGS.

4-5, a content unit can be exchanged between a client and server using adaptive flow control techniques.

The process 400 of FIG. 4 begins in block 402, in which a server receives from a client a request to transfer a file to the client. In block 404, the client and server may then negotiate with one another in any suitable manner to identify an initial window size to be used in transferring content from the server to the client. For example, to establish a TFTP session by which to transfer the requested file, the server and the client may use option negotiation and option acknowledgement functionality of TFTP (for example, as described in the Internet Engineering Task Force (IETF) Request for Comment (RFC) 2347) to identify various configuration parameters to use during the session. As part of this option negotiation process, messages may be exchanged identifying options to be set and proposed settings for those options. In embodiments, such messages may be exchanged between a client and a server to negotiate an initial window size. In some cases, a client may transmit to the server a proposal for a window size to use and the server may send an option acknowledgement accepting or rejecting the proposal. If the server rejects, the client may propose a new window size until the server accepts the proposal. In some embodiments, the negotiation regarding the initial window size may be a simple negotiation in which the client proposes a value that the client was preconfigured to propose and the server accepts the value proposed by the client.

After the negotiation of block 404, the client and server have agreed on an initial window size to use when transferring content of the file requested in block 402 in one or more datagrams from the server to the client. In block 406, the content of the requested file is transferred in the datagram(s) using a current window size. Thus, the server will transmit a certain number of datagrams and wait for at least one acknowledgement of proper receipt of datagrams from the client before transmitting more datagrams.

At a start of the process, the current window size is the initial window size. Though, the window size may change during transfer of the content. In the example of FIGS. 4 and 5, the client is responsible for changing the window size. Examples of ways in which the client may decide to change the window size are discussed in greater detail below in connection with FIG. 5. If the client elects to change the window size for whatever reason, though, the client will transmit to the server a request to change the window size. Accordingly, in block 408, the server determines whether a request to change the window size was received. If such a request was received, then in block 410 the window size is changed to the value identified in the request. After the window size is changed, or if no request was received, in block 416 the server determines whether more content of the file requested in block 402 is to be transmitted as datagrams. If so, then the server continues in block 406 transmitting content using the current window size. If not, then the server closes the session with the client and the process 400 ends.

While the server is carrying out the process 400 of FIG. 4 to transfer a file to a client, the client may be carrying out the process 500 of FIG. 5 to receive the file. The process 500 begins in block 502, in which a client transmits to the server a request to transfer a particular file to the client. In block 504, the client and the server negotiate regarding an initial window size to be used in transferring the file to the client. As discussed above in connection with FIG. 4, the client and server may exchange messages in any suitable manner, including, when TFTP will be used to transfer the file, using TFTP option negotiation and option acknowledgement messages. Using such a process, the client may propose values for the initial window size, which the server may accept or reject. The client may propose any suitable value that was determined in any suitable manner. For example, the client may evaluate conditions on the client or in the network, or evaluate available resources on the client or the network (such as memory available on the client for buffering received datagrams), and propose a value for the initial window size based on that evaluation. As another example, the client may propose values that the client is configured to use. A user, including an administrator of the client or of a network to which the client is connected, may provide a value to the client to be proposed by the client as an initial window size. For example, software that implements a protocol may include various configuration values that may parameterize sessions created according to that protocol, and a value for an initial window size may be part of that configuration value.

After the client proposes a value for the initial window size that is accepted by the server, the server may begin transferring the requested file to the client and the client may, in block 506, receive content transferred by the server. As each datagram including content is received, the client may transmit an acknowledgement to the server that the datagram was properly received. The client may also monitor time periods for a session and for datagrams. The time periods may be used by the client for two reasons. First, the client may use a time period to determine success of a current window size (which, at the outset of the process 500, may be the initial window size, but which may change during the process 500) in transferring content without error. For example, if during a period of time no datagrams are lost, then the client may be able to determine that that window size has been successful for transferring content and that the window size is not resulting in a rate of transmission of datagrams that is overwhelming the network and is not overwhelming buffers on the client. Second, the client may use a time period to determine whether a datagram has been lost. When a datagram is transmitted by the server, the client may expect to receive the datagram within a certain time. The client may also be able to anticipate when the datagram is transmitted by the server based on when an acknowledgement was previously sent that would have resulted, on the server, of transmission of another datagram. Additionally, if later-transmitted datagrams are received at the client (as indicated by sequence numbers included in the datagrams), then the client may be able to determine whether a datagram was transmitted and whether a datagram was lost. Any suitable time periods may be used for either of these periods. For example, in some cases a time associated with receiving a number of datagrams may be used as the time period (e.g., the time to receive four datagrams, such that after the number of datagrams is received the time period expires) while in other cases a fixed measure of time (e.g., one hundred milliseconds, or three seconds) may be used.

Accordingly, in block 506, in addition to receiving content and transmitting acknowledgements, the client may monitor time periods for the session, including the time periods mentioned above. In block 508, the client determines whether any datagrams have been lost and not received. If no datagrams have been lost, then in block 510 the client may determine whether the time period for detecting success of the current window size has expired. If this time period has not expired, then the process 500 continues to block 518 discussed below. If, however, the time period is detected in block 510 to have expired, then the client may determine from the expiration that no losses have been detected and that the current window size has been successful for transferring content. In this case, the client may infer that the current window size is not overburdening the client or the network and that the current window size may be preventing the server and from using some available resources. In this case, the client may determine in block 512 to increase the window size so as to use more resources and may transmit to the server a request to increase the window size. The client may increase the window size by any suitable amount and may transmit the request to the server in any suitable manner, as embodiments are not limited in this respect. Examples of ways in which the window size may be increased are discussed below in connection with FIG. 6. After requesting the change in window size, the client proceeds to block 518 of process 500.

In contrast, if in block 508 the client determines that a datagram was lost, the client may infer that the current window size is overburdening the client or the network or requires more resources than are available. In this case, the client may determine in block 514 to decrease the window size so as to use less resources and may transmit to the server a request to decrease the window size. Again, the client may decrease the window size by any suitable amount and may transmit the request in any suitable manner, as embodiments are not limited in this respect. Examples of ways in which the window size may be decreased are discussed below in connection with FIG. 6.

Additionally, in block 514 the client may reset a time period used for determining whether a current window size has been successful at transmitting content. This is because, when the loss is detected in block 508, the client inferred that the window size has not been successful at transferring content. Resetting the window size in block 514 ensures that the client monitors the new window size for the time period, rather than monitoring the unsuccessful window size previously used.

In block 516, the client also informs the server of the lost datagram. The client may do this in any suitable manner, including by transmitting a message that a particular datagram was not received (if the client is able to determine which datagram was not received, such as by reviewing sequence numbers of properly-received datagrams), by not acknowledging the datagram that was not received, or by transmitting an acknowledgement for the last properly-received datagram that preceded the loss. After informing the server of the loss, the client proceeds to block 518 of process 500.

In block 518, the client determines whether more content is to be received. If so, the client returns to block 506, where the client receives content, transmits acknowledgements, and monitors time periods using the current window size, which may have been adjusted in block 512 or block 514. The client therefore continues to receive content, monitor time periods, and adjust the window size throughout the transfer of the file. When the client detects that no more content is to be received, the process 500 ends.

While the processes of FIGS. 4 and 5 described a negotiation regarding an initial window size that included negotiating an exact value for the window size, in some embodiments the negotiation may not result in a value. Rather, in some embodiments, instead of carrying out a negotiation of a particular value using TFTP negotiation messages, a client may merely propose in a message that adaptive flow control techniques be used and the server may acknowledge that such techniques will be used. In some such embodiments, the message from the client may include a version number or other identifier for the adaptive flow control techniques to be used by the client and the server may evaluate the version number or identifier to determine if the server supports compatible flow control techniques. If so, the server may acknowledge that adaptive flow control will be used. In these embodiments, once the client and server agree to use adaptive flow control, the client may include in an acknowledgement message transmitted to the server a value to be used for the window size and the server may use then use the window size included in the acknowledgement message.

Figure 6:
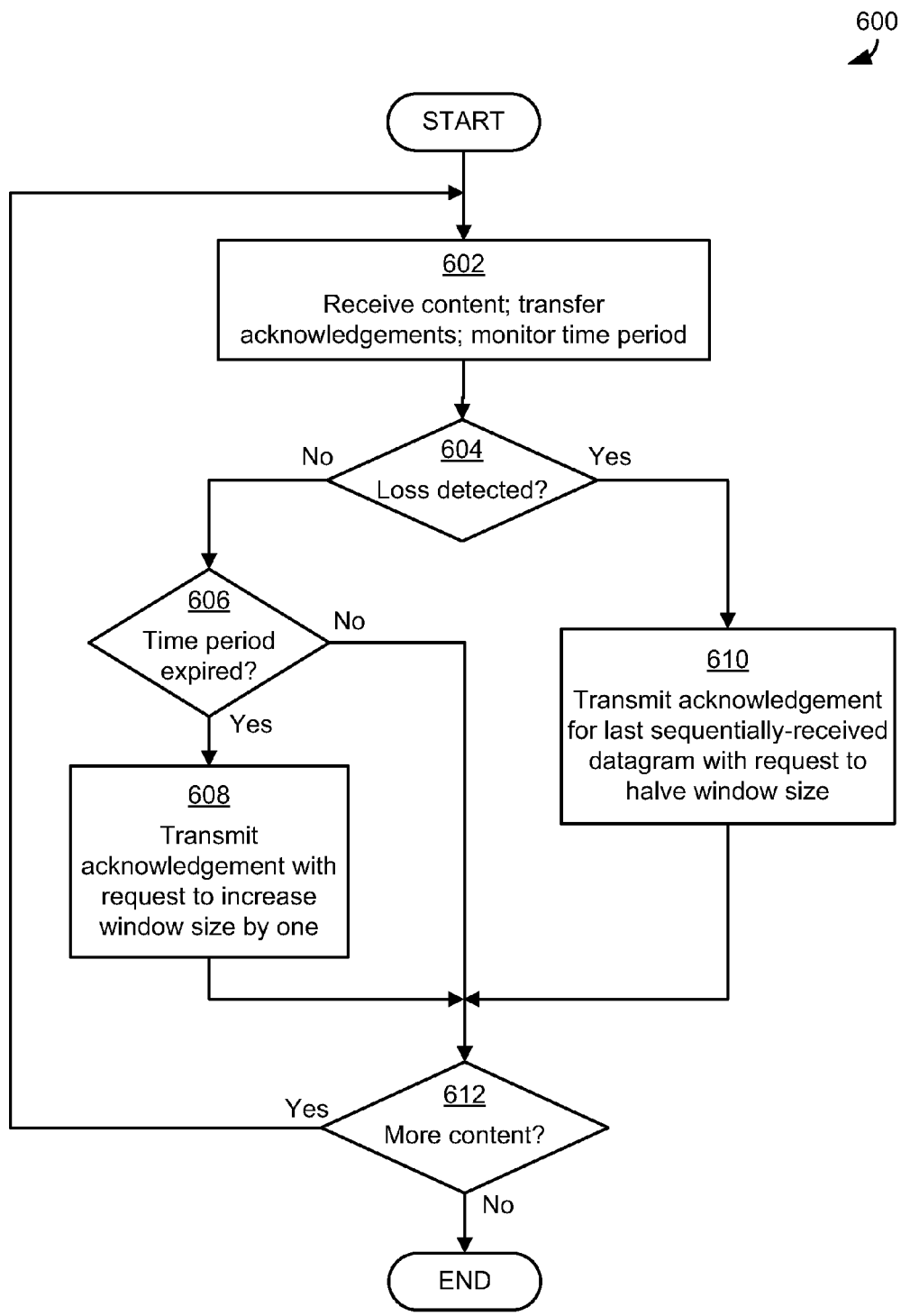
FIG. 6 is a flowchart of one exemplary process that may be carried out by a client in some embodiments to adjust a window size.

As mentioned above, when a client decides to change a window size, the client may adjust the window size by any suitable value and may communicate with the server in any suitable way to change the window size, as embodiments are not limited in this respect. FIG. 6 illustrates one exemplary process that may be used by a client to adjust a window size.

Process 600 begins in block 602, in which the client receives content, transmits acknowledgements, and monitors time periods. The client may also detect, in block 604, whether any datagrams have been lost by determining whether any datagram has not been received within the time period in which the datagram should have been received. If no datagrams have been lost, then the client may determine in block 606 whether a time period for determining success of a current window size has expired. The client may carry out the operations of blocks 602, 604, and 606 in any suitable manner, including according to exemplary techniques described above in connection with blocks 506, 508, and 510 of FIG. 5.

If the client determines in block 606 that the time period has expired, then the client may infer that the current window size is not overburdening the network or the client and that the current window size may prevent the server and the client from using some available resources. In this case, the client may request that the server increase the current window size. In the example of FIG. 6, the client requests a change to the window size as part of an acknowledgement message transmitted to the server acknowledging proper receipt of a datagram. The acknowledgement message may be used to convey any suitable information regarding the request. In some cases, the client may add to the acknowledgement message only a value identifying a new window size that the client is requesting and the server may understand the extra value to be a request to change the window size. In other cases, other information may be added that specifies that the client is requesting a change in window size and/or that the client is requesting an increase or decrease in the window size.

As discussed above, in many environments in which connectionless transfer protocols like TFTP are used, limited resources are available for transferring content between a client and server. Accordingly, protocols like TFTP are adapted to use limited resources. When a client, using adaptive flow control techniques as described herein, requests that a window size be increased, however, the client is requesting that more resources be allocated to transferring the content. If the client requests too many resources, though, then the transfer may fail or datagrams may be lost. Even if the client lowers the window size later in response to detecting a loss or failure, more resources will be used renegotiating the window size and retransferring the lost datagrams. Accordingly, in some embodiments, the client may be cautious in increasing the window size. In particular, in these embodiments, when the window size is to be increased, the window size may only be increased by a small amount. In the example of FIG. 6, the client only increases the window size by one.

Thus, when the client determines in block 606 that the time period for detecting a success of a window size has expired and decides to increase the window size, the client will increase the window size by one and add the new window size to the acknowledgement message to be passed to the server.

The client may carry out a similar process when a window size is to be decreased. If the client determines in block 604 that a datagram has been lost, then the client may decrease the window size by informing the server through an acknowledgement message. In some cases, as discussed above, the client may add only the new, lower window size to the acknowledgement message and the server may understand the value to be a request to change the window size. The client may also use any suitable value as the new value for the lower window size. As mentioned above in connection with increasing the window size, when a datagram is lost, more resources are consumed in terms of renegotiating a window size and retransferring lost datagrams. Reducing a number of losses experienced by the client can therefore be advantageous, especially in environments with limited resources. Thus, when the client detects a loss in block 604, the client may set the window size to a value that reduces the likelihood that another datagram will be lost. For example, the client may set the new window size to half of the current window size. As another example, the client may set the new window size to half of the window size plus a threshold ((WS+N)/2, where WS is the current window size). By dropping the window size this much, the client may avoid losing more datagrams and therefore use available resources efficiently.

When a datagram is lost, the client in block 610 informs the server of the new window size and of the loss of the datagram. Both of these pieces of information may be conveyed by an acknowledgement message. In particular, in the example of FIG. 6, the new window size is an acknowledgement message that acknowledges receipt of the last datagram properly received in a sequence. For example, if the client receives datagrams 1, 2, 3, 5, 6, and detects that datagram 4 is lost, then in block 610 the client may acknowledge proper receipt of datagram 3. The acknowledgement sent in block 610 may be a duplicate acknowledgement, as the client may already have acknowledged receipt of datagram 3. However, acknowledging datagram 3 in this manner identifies to the server that the server should retransmit all content following datagram 3 as a result of the loss of datagram 4. In some cases, the client may repeat acknowledging the last sequentially-received datagram until the lost datagram is received. Using the example above, if the client determines that datagram 4 was lost, then upon receiving datagrams 7, 8, and 9 the client may repeatedly acknowledge datagram 3, which further signals to the server that datagram 4 should be retransmitted.

In block 612, the client determines whether more content is to be received. If so, the client returns to block 602, where the client receives content, transmits acknowledgements, and monitors time periods using the current window size, which may have been adjusted in block 608 or block 610. The client therefore continues to receive content, monitor time periods, and adjust the window size throughout the transfer of the file. When the client detects that no more content is to be received, the process 600 ends.

By adjusting the window size as outlined in the example of FIG. 6, the client may try to make better use of available resources while avoiding using too many resources. By using the slow ramp-up of FIG. 6, where the window size is only increased by one and only following evaluation of a current window size over a time period to ensure that it is successful, then the client may try to prevent overwhelming the network or the client. This cautious increasing may be, in some cases, a square root-order increase. Similarly, by using the drastic decrease of FIG. 6, where the window size is decreased by half following a loss, the client may try to recover quickly from overwhelming the network or the client. This drastic decreasing may be, in some cases, an exponential-order decrease.

In some embodiments, in addition to decreasing the window size upon detecting a loss, the client may also maintain for a session between a client and a server a maximum successful window size. The maximum successful window size may be an actual window size that was determined to be successful or may be determined based on evaluation of window sizes used during transfer of content between the client and server. When a maximum successful window size is maintained, in some cases the client will not increase the window size above the maximum.

Figure 7:
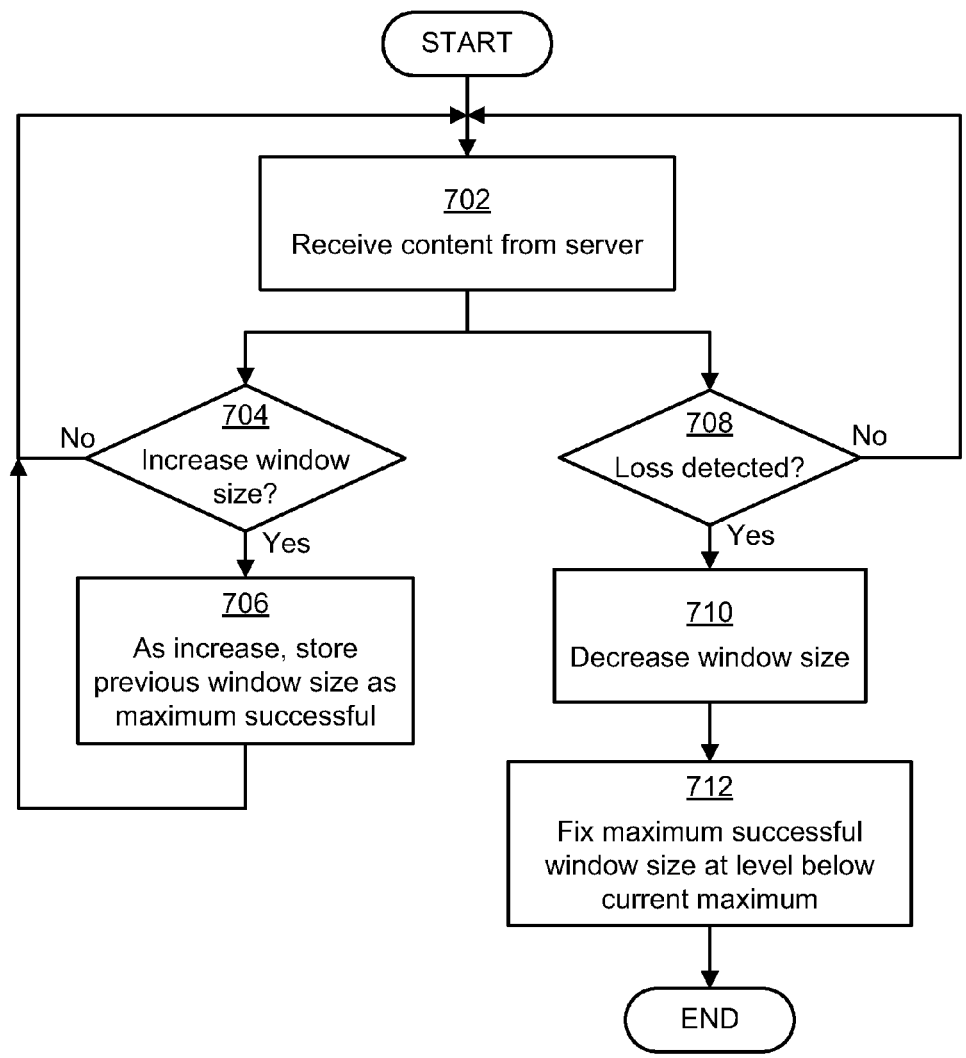
FIG. 7 is a flowchart of one exemplary process that may be carried out by a client in some embodiments to identify a maximum successful window size.

FIG. 7 illustrates one process that may be used for maintaining a maximum successful window size. Embodiments that maintain such a maximum successful window size are not limited to implementing the process of FIG. 7, as others are possible.

The process 700 begins in block 702, in which the client begins receiving content from a server. As above, the client may be receiving content, transmitting acknowledgements, and monitoring time periods in block 702. At this point in the process, the window size has not been reduced, but has stayed the same or has only been increased. In block 704, it is determined whether the client is going to increase the window size based on success of the current window size. If so, then in block 706, when the window size is increased, the previous window size by which the content was received in block 702 is stored as the maximum successful window size. The previous window size is stored as the maximum successful because, first, that window size was determined to be successful as part of determining whether to increase the window size, and, second, because the window size has not yet been reduced, the previous window size is currently the maximum successful.

If the window size is not to be increased or after the window size is increased and the previous window size is stored as the maximum, the process 700 returns to block 702 to continue receiving content from the server. Blocks 704 and 706 may be repeated, as the client observes successes with the window sizes and increases the window size.

When the client determines in block 704 whether the window size is to be increased, the client may also determine whether any datagrams have been lost. In block 708, following the receiving of block 702, the client determines whether any losses have been detected. If no losses have been detected, then the client continues to receive content in block 702.

If, however, a loss has been detected, then in block 710 the window size is decreased. As a result of the loss, then the client may determine that the maximum successful window size for the session has been exceeded. As discussed above in connection with FIG. 6, when there are limited resources available, a client may lower a window size drastically to reduce the number of future losses and future renegotiations of the window size. A similar process may be carried out when determining the maximum successful window size. While the value currently stored by the client (as a result of the storing of block 706) as the maximum successful window size may indicate a window size that was previously successful, that window size may have been precisely at the capacity for the network and/or the client at that time. If that window size is used again, if conditions change slightly in the network and/or on the client, a loss may be experienced at that window size. Accordingly, in block 712 the maximum successful window size most recently stored in block 706 is reduced to a lower level. For example, the maximum successful window size may be reduced to 20 percent below the currently-stored value, or may be reduced by any other amount. When the maximum successful window size is reduced in block 712, the maximum successful window size may also be fixed for the duration of the session between the client and the server, while a file is being transferred. Once the maximum is fixed, the maximum will not be increased later and the client will prevent the window size from being increased above the maximum.

By setting the maximum in this way, the client may again make an effort to reduce the number of losses and prevent using resources to negotiate window sizes and retransfer lost datagrams while at the same time using an adjustable window size to ensure that available resources may be used efficiently.

Described above are various examples of ways in which a connectionless transfer protocol, like TFTP, can be used to transfer content units using adjustable window sizes. These techniques can be used by any suitable clients and servers to exchange content units.

In some cases, a server may be able to use adaptive flow control techniques as described herein to transfer content units (e.g., files), but a client that requests such a transfer may not be able to use adaptive flow control. In some such cases, a server may provide to a client software to enable the client to use adaptive flow control techniques. For example, where TFTP is used as the connectionless transfer protocol, the server may send to the client software implementing TFTP and implementing the adaptive flow control techniques described herein. The client may then execute the received software and the software may interact with the server to transfer content units. Such software was described briefly above in connection with flow control facility 112 of FIG. 1. In some embodiments, the software may implement a transfer protocol like TFTP and may implement other protocols, including the WDS and PXE protocols mentioned above. In embodiments where the software may be running in a computing device with limited resources, such as a computing device without an operating system and without other software for interacting with networks (e.g., software implementing TCP), the software may be adapted to operate network devices on the client to send and receive information via a network. For example, the software may include Universal Network Device Interface (UNDI) functions that are able to interact with network devices on the client, like network interface cards, and operate the network devices to transfer content units according to a connectionless transfer protocol.

Figure 8:
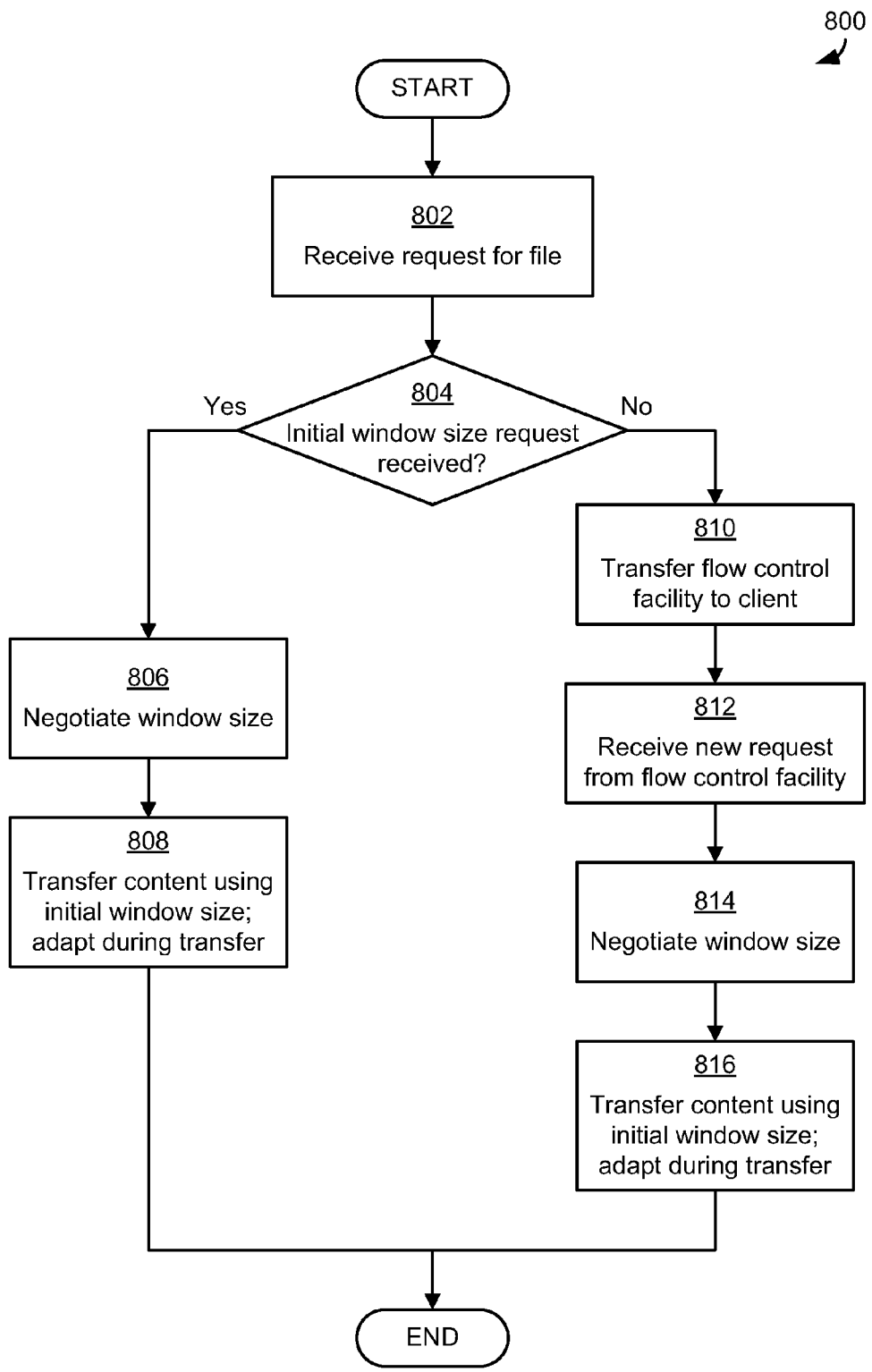
FIG. 8 is a flowchart of one exemplary process that may be carried out by a server in some embodiments to determine whether to transfer to the client software to enable the client to use adaptive flow control techniques.

A server may determine in any suitable manner when to send to a client software to enable the client to use adaptive flow control techniques. FIG. 8 shows one technique that may be used in some embodiments for determining when to convey the software to the client. Embodiments that include such software and transfer the software from a server to a client are not, however, limited to implementing the technique of FIG. 8.

The process 800 begins in block 802, in which a server receives from a client a request to transfer a file from the server to the client using TFTP. As a part of establishing and configuring a session between the client and server for transferring the file, various options may be negotiated between the client and the server. In block 804, the server determines whether those options include a proposal for an initial window size. If a request was received for an initial window size, then in block 806 the server and client may negotiate the initial window size using any suitable technique, including techniques described above, and, in block 808, transfer content according to the initial window size and adapt the window size during transfer of the content of the file. The process 800 then ends once the file is transferred.

If, however, the server determines in block 804 that an initial window size request was not received, then the server may in block 810 transfer to the client a flow control facility. The flow control facility transferred in block 810, as discussed above, allows a client to transfer files using adaptive flow control techniques. After the client receives the flow control facility, the client may execute the flow control facility. In some cases, the client may be expecting to execute a facility received from the server in response to the request of block 802 and, as such, may execute the facility received in block 810. In other cases, the server may instruct the client in some way to execute the facility, such as via a protocol like a PXE Application Programming Interface (API) or via any suitable message-passing technique.

In block 812, once the client is executing the flow control facility, the server may in block 812 receive a new request for the file from the flow control facility. As part of establishing a session with the flow control facility on the client, the client and server in block 814 negotiate an initial window size. In block 816, content of the file is transferred using the initial window size and the window size is adapted during the content. The process 800 then ends once the file is transferred.

While the process of FIG. 8 illustrates an example in which a client natively supports adaptive flow control and may include in the request received in block 802 an initial window size, embodiments are not limited in this respect. In some other embodiments, clients do not natively support adaptive flow control and will not include in the request of block 802 any initial window size. In such embodiments, the server will not carry out the determination of block 804 and will instead transfer the flow control facility to the client in response to receiving the request.

Techniques operating according to the principles described herein may be implemented in any suitable manner Included in the discussion above are a series of flow charts showing the steps and acts of various processes that enable use of flow control techniques with connectionless content unit transfer protocols like TFTP. The processing and decision blocks of the flow charts above represent steps and acts that may be included in algorithms that carry out these various processes. Algorithms derived from these processes may be implemented as software integrated with and directing the operation of one or more multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit, or of any particular programming language or type of programming language. Rather, the flow charts illustrate the functional information one of ordinary skill in the art may use to fabricate circuits or to implement computer software algorithms to perform the processing of a particular apparatus carrying out the types of techniques described herein. It should also be appreciated that, unless otherwise indicated herein, the particular sequence of steps and acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, or any other suitable type of software. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations needed to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may form a part of a software package, for example as a part of a program that includes functionality to transfer content units (e.g., files) or as part of a program to carry out a variety of functions including transferring content, such as Windows Deployment Services (WDS) programs on a client or server. These functional facilities may, in alternative embodiments, be adapted to interact with other, unrelated functional facilities and/or processes, to implement a software program application. In other implementations, the functional facilities may be adapted to interact with other functional facilities in such a way as form an operating system, including the Windows® operating system, available from the Microsoft® Corporation of Redmond, Wash. In other words, in some implementations, the functional facilities may be implemented alternatively as a portion of or outside of an operating system.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 906 of FIG. 9 described below (i.e., as a portion of a computing device) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 1. Functional facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

Figure 9:
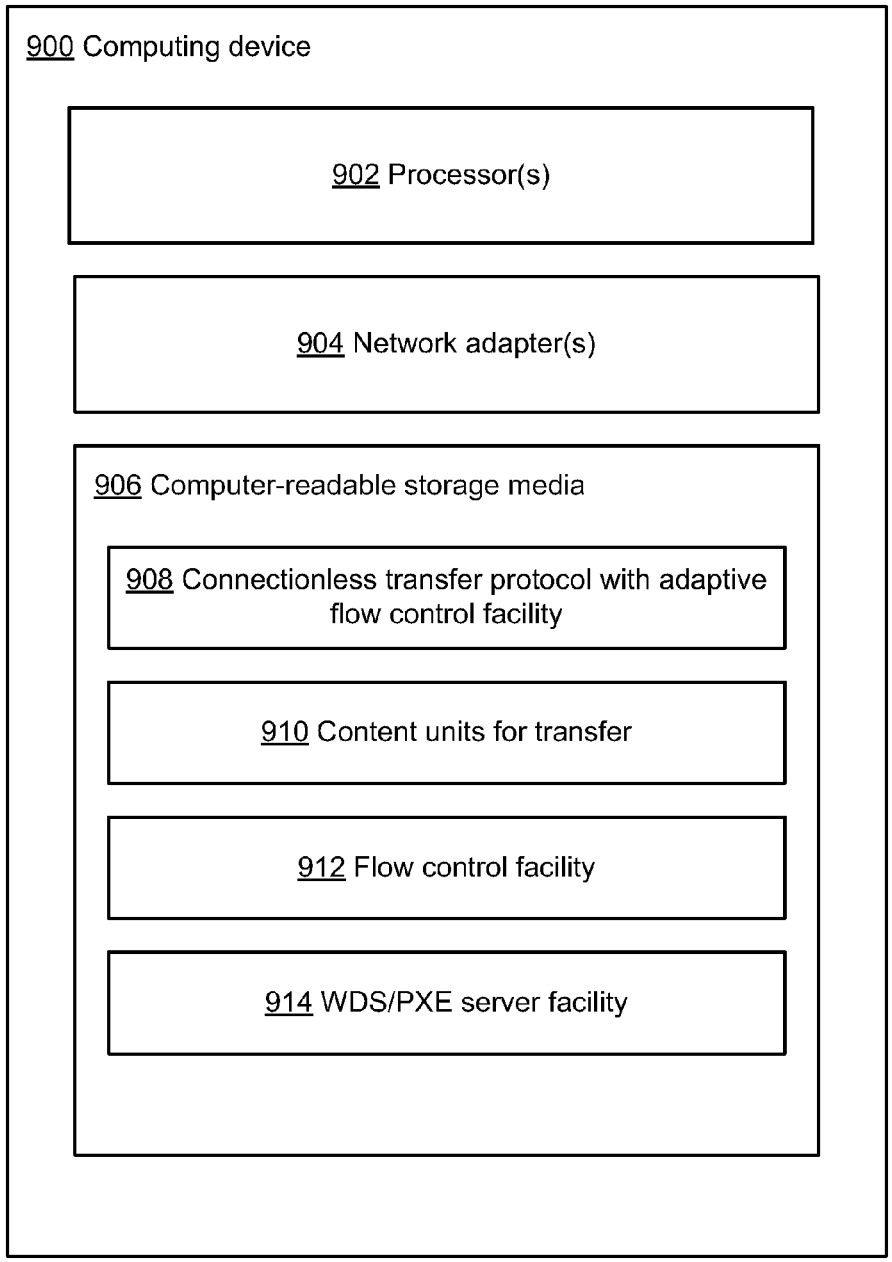
FIG. 9 is a block diagram of one exemplary computing device that may be used as a server in some embodiments.
Figure 10:
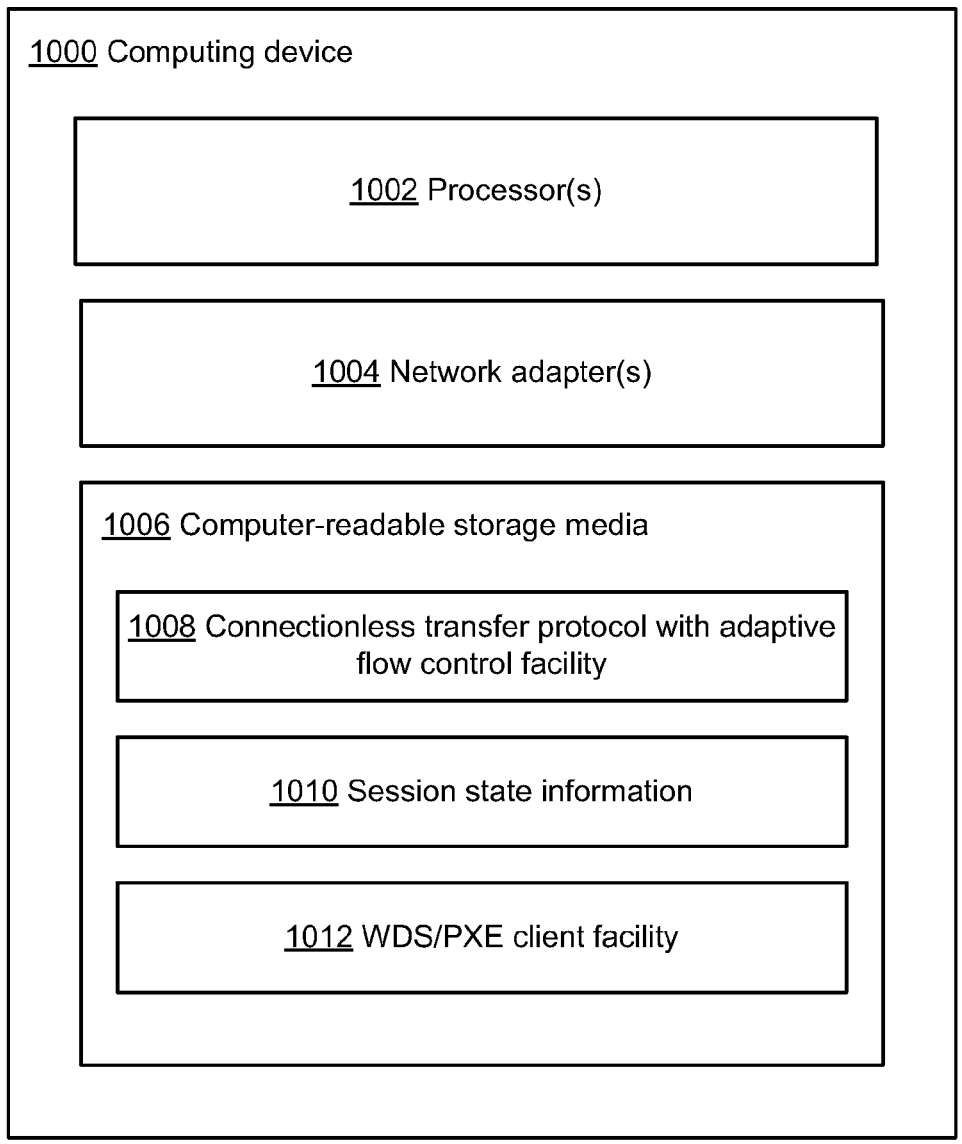
FIG. 10 is a block diagram of one exemplary computing device that may be used as a client in some embodiments.

FIGS. 9 and 10 illustrate exemplary implementations of computing device in the form of a computing devices 900, 1000 that may be used in a system implementing the techniques described herein, although others are possible. It should be appreciated that FIGS. 9 and 10 are intended neither to be depictions of necessary components for a computing device to operate in accordance with the principles described herein, nor comprehensive depictions.

FIG. 9 illustrates one exemplary computing device that may be used as a server in accordance with techniques described herein. A server, in this context, does not refer to any particular type of computing device, but rather refers to a device that may be a source of a content unit to be transferred to a destination.

Computing device 900 may comprise at least one processor 902, a network adapter 904, and computer-readable storage media 906. Computing device 900 may be, for example, a desktop or laptop personal computer, a personal digital assistant (PDA), a smart mobile phone, a wireless access point or other networking element, a resource-heavy device that may typically be used as a server, or any other suitable computing device. Network adapter 904 may be any suitable hardware and/or software to enable the computing device 900 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 906 may be adapted to store data to be processed and/or instructions to be executed by processor 902. Processor 902 enables processing of data and execution of instructions. The data and instructions may be stored on the computer-readable storage media 906 and may, for example, enable communication between components of the computing device 900.

The data and instructions stored on computer-readable storage media 906 may comprise computer-executable instructions implementing techniques which operate according to the principles described herein. In the example of FIG. 9, computer-readable storage media 906 stores computer-executable instructions implementing various facilities and storing various information as described above. Computer-readable storage media 906 may store a facility 908 that implements a connectionless content unit transfer protocol with adaptive flow control in accordance with at least some of the principles described herein and that may implement none, some, or all of the exemplary techniques described above. The computer-readable storage media 906 may also store content units that can be transferred to a client using the facility 908. A flow control facility 912 may also be stored on the computer-readable storage medium 906, as in some embodiments (as discussed above) the server may transfer the facility 912 to a client to enable the client to use adaptive flow control techniques as described herein. Lastly, in some embodiments the computer-readable storage media 906 may include a WDS/PXE server facility 914 that implements server functionality of WDS and/or PXE, as in some embodiments techniques described herein may be used to transfer operating system files.

FIG. 10 illustrates one exemplary computing device that may be used as a client in accordance with techniques described herein. A client, in this context, does not refer to any particular type of computing device, but rather refers to a device that may be a destination of a content unit transferred from a source.

Computing device 1000 may comprise at least one processor 1002, a network adapter 1004, and computer-readable storage media 1006. Computing device 1000 may be, for example, a desktop or laptop personal computer, a personal digital assistant (PDA), a smart mobile phone, a resource-heavy computing device that may be typically used as a server, a wireless access point or other networking element, or any other suitable computing device. Network adapter 1004 may be any suitable hardware and/or software to enable the computing device 1000 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 1006 may be adapted to store data to be processed and/or instructions to be executed by processor 1002. Processor 1002 enables processing of data and execution of instructions. The data and instructions may be stored on the computer-readable storage media 1006 and may, for example, enable communication between components of the computing device 1000.

The data and instructions stored on computer-readable storage media 1006 may comprise computer-executable instructions implementing techniques which operate according to the principles described herein. In the example of FIG. 10, computer-readable storage media 1006 stores computer-executable instructions implementing various facilities and storing various information as described above. Computer-readable storage media 1006 may store a facility 1008 that implements a connectionless content unit transfer protocol with adaptive flow control, in accordance with at least some of the principles described herein and that may implement none, some, or all of the exemplary techniques described above. The computer-readable storage media 1006 may also store session state information 1010, which may include information on time periods, maximum successful window sizes, received datagrams, and other information related to a transfer session between the facility 1008 and a server. In some embodiments, the computer-readable storage media 1006 may also includes a WDS/PXE client facility 1012 that implements client functionality of WDS and/or PXE, as in some embodiments techniques described herein may be used to transfer operating system files.

While not illustrated in FIGS. 9 and 10, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method for transmitting content units from a server computing device to at least one client, the method comprising:
   receiving, by the server computing device, a request to transfer a content unit to a client with a connectionless transfer protocol;
   negotiating, by the server computing device, an initial window size defined as a number of datagrams, with which to begin transferring the content unit to the client;
   transmitting, by the server computing device, at least a portion of the content unit to the client using the connectionless transfer protocol and using the initial window size as a current window size;
   receiving, by the server computing device, a request from the client to change the number of datagrams of the current window size;
   in response to the received request, changing the number of datagrams of the current window size; and
   transmitting, by the server computing device, at least another portion of the content unit to the client using the connectionless transfer protocol and using the changed current window size.

2. The method of claim 1, wherein the client is an unauthenticated client.

3. The method of claim 1, wherein the connectionless transfer protocol is a connectionless file transfer protocol.

4. The method of claim 3, wherein the connectionless file transfer protocol is the Trivial File Transfer Protocol (TFTP).

5. The method of claim 1, wherein the method further comprises:
   in response to the request to transfer the content unit, transmitting to the client a software facility adapted to:
      receive content of the content unit via the connectionless transfer protocol, and to
      transmit the request to change the number of datagrams of the current window size.

6. The method of claim 5, wherein receiving the request to change the number of datagrams of the current window size includes:
   receiving the request to change the number of datagrams of the current window size from the software facility.

7. The method of claim 1, wherein the method further comprises:
   receiving a second request to transfer the content unit using the connectionless transfer protocol, the second request comprising an indication that the client is executing a software facility transferred to the client in response to the request to transfer the content unit.

8. A method for receiving content units distributed by a server, the method comprising:
   transmitting, by a computing device, a request to the server to transfer, using a connectionless transfer protocol, a content unit;
   negotiating, by the computing device, with the server, a window size, defined in terms of a quantity of datagrams, with which to begin transferring the content unit using the connectionless transfer protocol;
   beginning reception, by the computing device, of a portion of the content unit using the connectionless transfer protocol;
   determining, by the computing device, whether the portion of the content unit is successfully received by the computing device during a threshold duration of time; and
   in response to a result of the determining, transmitting a request to the server to change the number of datagrams of the window size.

9. The method of claim 8, wherein the method further comprises:
   additionally determining whether another portion of the content unit is successfully received by the computing device during the threshold duration of time; and
   in response to a result of the additionally determining, transmitting another request to the server to change the number of datagrams of the window size.

10. The method of claim 8, wherein determining whether the portion of the content unit is successfully received comprises:
    determining whether, during the threshold duration of time, any content of the content unit was received out of sequence.

11. The method of claim 10, wherein the method further comprises:
    determining whether a predetermined amount of content is received in a proper sequence after transmission of the request to change the number of datagrams of the window size.

12. The method of claim 10, wherein transmitting the request to change the current window size comprises:
    if it is determined that the portion of the content unit is successfully received during the threshold duration of time, then transmitting the request to change the window size includes requesting that the window size be increased by one datagram; and
    if it is determined that the portion of the content unit is not successfully received during the threshold duration of time, then transmitting the request to change the window size includes requesting that the window size be reduced by more than one datagram.

13. The method of claim 8, wherein transmitting to the server the request to transfer comprises transmitting an indication that adjustable window sizes are supported by the computing device.

14. The method of claim 8, wherein negotiating with the server the initial window size includes instructing the server to use a particular number of datagrams as the window size.

15. The method of claim 8, wherein the method further comprises:
    determining a maximum successful window size for the computing device.

16. The method of claim 15, wherein determining the maximum successful window size comprises:
    during a test threshold duration of time following an increase to the window size, determining whether content of the content unit is successfully received;
    if the content of the content unit is successfully received during the test threshold duration of time and the window size is greater than the maximum successful window size, increasing the maximum successful window size to the window size; and
    if the content of the content unit is not successfully received during the test threshold duration of time and the window size is greater than the maximum successful window size, decreasing the maximum successful window size.

17. At least one computer-readable memory having computer-executable instructions stored therein for causing a computing device to perform operations for distributing files from a server to at least one client, the operations comprising:
    receiving a request to transfer, using the Trivial File Transfer Protocol (TFTP), at least one file to a client;
    negotiating with the client an initial window size, defined as a number of datagrams, with which to begin transferring the at least one file to the client using TFTP;

transmitting at least a portion of the at least one file using TFTP with the initial window size as a current window size;

receiving a request from the client to change the number of datagrams of the current window size; and changing the number of datagrams of the current window size according to the request.

18. The at least one computer-readable memory of claim 17, wherein the operations further comprise:

in response to the request to transfer the at least one file, transmitting to the client a software facility adapted to: receive content of the at least one file via TFTP; and to transmit the request to change the number of datagrams of the current window size.

19. The at least one computer-readable memory of claim 18, wherein the operations further comprise:

receiving a second request to transfer the at least one file using TFTP, the second request comprising an indication that the client is executing the software facility.

20. The at least one computer-readable memory of claim 19, wherein transmitting at least the portion of the at least one file comprises transmitting at least one operating system file in accordance with a Windows Deployment Services (WDS) protocol.

* * * * *